United States Patent
Zhu et al.

(10) Patent No.: US 10,498,033 B2
(45) Date of Patent: Dec. 3, 2019

(54) COMMUNICATIONS DEVICE

(71) Applicant: HUAWEI TECHNOLOGIES CO., LTD., Shenzhen (CN)

(72) Inventors: Wei Zhu, Shenzhen (CN); Silei Huyan, Xi'an (CN); Zhiyong Sun, Xi'an (CN); Yi Wang, Xi'an (CN); Shiqiang Lu, Xi'an (CN); Hui Yu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/325,181

(22) PCT Filed: Aug. 12, 2016

(86) PCT No.: PCT/CN2016/094926
§ 371 (c)(1),
(2) Date: Feb. 12, 2019

(87) PCT Pub. No.: WO2018/027921
PCT Pub. Date: Feb. 15, 2018

(65) Prior Publication Data
US 2019/0198996 A1 Jun. 27, 2019

(51) Int. Cl.
*H04M 1/00* (2006.01)
*H01Q 5/35* (2015.01)
(Continued)

(52) U.S. Cl.
CPC .............. *H01Q 5/35* (2015.01); *H01Q 1/48* (2013.01); *H01Q 5/10* (2015.01); *H04B 5/0031* (2013.01)

(58) Field of Classification Search
CPC ... H01Q 5/35; H01Q 1/48; H01Q 5/10; H04B 5/0031
(Continued)

(56) References Cited

U.S. PATENT DOCUMENTS

2014/0139380 A1   5/2014   Ouyang et al.
2015/0180136 A1   6/2015   Yosui et al.
(Continued)

FOREIGN PATENT DOCUMENTS

CN      201758180 U    3/2011
CN      104471789 A    3/2015
(Continued)

*Primary Examiner* — Marcos Batista
(74) *Attorney, Agent, or Firm* — Kilpatrick Townsend & Stockton LLP

(57) ABSTRACT

A communications device includes an antenna including a radiator and a ground. A NFC circuit and the radiator are coupled at a first node; a non-NFC circuit and the radiator are coupled at a second node by using a non-NFC feeding path, the non-NFC feeding path includes two capacitors with different capacitances. The radiator forms a first part between the first node and the second node. The radiator includes a second part, one end of the second part is coupled to the ground, and the other end is connected to the first part. An electrical length of the second part is less than a quarter wavelength corresponding to a resonance frequency of a low frequency signal, and the electrical length of the second part is greater than an electrical length of the first part. The radiator includes a third part from the first node to an endpoint of the radiator.

18 Claims, 7 Drawing Sheets

(51) Int. Cl.
*H01Q 1/48* (2006.01)
*H01Q 5/10* (2015.01)
*H04B 5/00* (2006.01)

(58) Field of Classification Search
USPC ................................... 455/550.1; 370/338
See application file for complete search history.

(56) References Cited

U.S. PATENT DOCUMENTS

| 2015/0249292 | A1 | 9/2015 | Ouyang et al. |
| 2015/0249485 | A1* | 9/2015 | Ouyang ............... H04B 5/0081 455/41.1 |
| 2016/0380337 | A1 | 12/2016 | Lee et al. |

FOREIGN PATENT DOCUMENTS

| CN | 104953289 A | 9/2015 |
| CN | 204760528 U | 11/2015 |
| CN | 105826679 A | 8/2016 |
| CN | 106299677 A | 1/2017 |

\* cited by examiner

COMMUNICATIONS DEVICE

CROSS-REFERENCE TO RELATED APPLICATIONS

This application is a National Stage of International Application No. PCT/CN2016/094926 filed on Aug. 12, 2016, which is hereby incorporated by reference in its entirety.

TECHNICAL FIELD

The present invention relates to the field of communications technologies, and in particular to a communications device.

BACKGROUND

Near field communication (Near Field Communication, NFC) is a short-distance non-contact communications technology, and an operating frequency for the near field communication is 13.56 MHz.

With this technology, non-contact point-to-point data transmission and exchange are allowed between communications devices. The technology is combined with a mobile communications technology, so as to implement a plurality of service functions such as electronic payment, identity authentication, ticket purchase, and anti-spoofing.

A conventional NFC antenna designed to support an NFC function usually includes a circuit coil and a ferrite material. However, a conventional NFC antenna that is implemented in this manner has a large area, high costs, and increases a thickness of a communications device. Therefore, researchers are always devoted to proposing a new NFC antenna solution.

An antenna structure and an electronic device are provided in a patent CN 204760528U. The antenna structure may be configured to process a signal associated with a non-near field communication circuit. The antenna structure further has a part that forms a near field communication loop antenna to process a signal that is associated with a near field communication circuit. In the antenna structure, the near field communication circuit and the non-near field communication circuit are first connected to one node and then connected to an antenna resonant element by using a feeding path. In the antenna structure, because the non-near field communication circuit, the near field communication circuit, and the antenna resonant element are connected to a same node, a length of an antenna resonant element corresponding to the near field communication circuit is limited by a length of an antenna resonant element corresponding to the non-near field communication circuit, thereby affecting a signal radiation capability of the near field communication circuit. In addition, in the antenna structure, when the non-near field communication circuit operates on a plurality of frequency bands, at least two branches need to be separately designed, for example, a low frequency band branch and a high frequency band branch mentioned in the patent. The high frequency band branch shares no part with the antenna resonant element corresponding to the near field communication circuit. Therefore, if space of a terminal is limited, the antenna structure that is of relatively large size and that is provided in the patent may be used. In addition, in a scenario in which the antenna resonant element is formed on a metal frame of the terminal, a slot needs to be reserved between ground and an endpoint of the high frequency band branch and between the ground and an endpoint of the low frequency band branch. In this case, at least two non-metal straps need to be disposed on a metal frame of a communications device, and structural coherence is broken.

A patent US2015/0249485A1 discloses an electronic device that includes a near field antenna. The near field antenna uses an inverted F antenna structure, and a non-near field communication circuit and a near field communication circuit share the antenna structure. In the antenna structure, when the non-near field communication circuit operates on a plurality of frequency bands, at least two branches need to be separately designed, for example, a low frequency band branch and a high frequency band branch mentioned in the patent. The two branches are respectively formed on two sides of a connection node between a non-near field circuit and an antenna resonant element. When the antenna resonant element is a metal frame of a terminal, a slot needs to be reserved between ground and an endpoint of the high frequency band branch and between the ground and an endpoint of the low frequency band branch. In this case, at least two non-metal straps need to be disposed on the metal frame, and structural coherence is broken.

SUMMARY

The present invention provides a communications device, and the communications device includes an antenna structure shared by a plurality of non-NFC signals and NFC signals.

According to an aspect, the present invention provides a communications device, and the communications device includes: a near field communication NFC circuit that is configured to process an NFC signal; a non-NFC circuit that is configured to process at least one low frequency signal and at least one high frequency signal, where both the low frequency signal and the high frequency signal are non-NFC signals; and an antenna structure, where the antenna structure is coupled to the NFC circuit and the non-NFC circuit, and the antenna structure includes a radiator and an antenna grounding part, where: the NFC circuit and the radiator are coupled by using an NFC feeding path, the NFC feeding path includes a low-pass circuit, and a connection point of the NFC feeding path and the radiator is a first node; the non-NFC circuit and the radiator are coupled by using a non-NFC feeding path, the non-NFC feeding path includes a first high-pass circuit and a first capacitor, the first high-pass circuit includes a second capacitor, a capacitance value of the second capacitor is greater than a capacitance value of the first capacitor, and a connection point of the non-NFC feeding path and the radiator is a second node; the radiator forms a first part between the first node and the second node; the radiator further includes a second part, a first end of the second part is coupled to the antenna grounding part, a second end of the second part is connected to the first part of the radiator, an electrical length of the second part is less than a quarter wavelength corresponding to a resonance frequency of the low frequency signal, and the electrical length of the second part is greater than an electrical length of the first part; and the radiator further includes a third part from the first node to an endpoint of the radiator. By using the device, an antenna structure can support both an NFC signal and a plurality of non-NFC signals, and a size of the antenna structure is relatively small.

The communications device includes a printed circuit board, and the antenna grounding part is formed on the printed circuit board.

The radiator is formed on a first conductive side frame of the communications device, so that a metal frame is used as an antenna.

A second conductive side frame of the communications device is connected to the antenna grounding part, and a non-conductive material is filled between the endpoint of the radiator and the second conductive side frame to form a slot, so as to expand an area of the antenna grounding part.

The first high-pass circuit is disposed on the printed circuit board and is connected to the radiator by using a first electrical connection device; and the antenna grounding part is connected to the radiator by using a second electrical connection device, and the low-pass circuit is disposed on the printed circuit board and is connected to the radiator by using a third electrical connection device. Therefore, internal composition flexibility of the device is improved.

The first electrical connection device, the second electrical connection device, or the third electrical connection device includes a spring plate, a screw, conductive foam, a spring, a conductive fabric, or a conductive adhesive.

That the capacitance value of the second capacitor is greater than the capacitance value of the first capacitor specifically means that the capacitance value of the second capacitor is at least one order of magnitude greater than the capacitance value of the first capacitor.

The capacitance value of the first capacitor is less than 3 pF, and the capacitance value of the second capacitor is greater than 32 pF; or the capacitance value of the first capacitor is less than 0.9 pF, and the capacitance value of the second capacitor is greater than 90 pF. Therefore, the second capacitor hinders the NFC signal, and the first capacitor and another part of the radiator may form a low-frequency resonant structure.

An operating frequency of the low frequency signal is less than 960 MHz, and an operating frequency of the high frequency signal is between 1710 MHz and 2690 MHz.

A grounding branch of the second part further includes a single-pole multi-throw switch, a throw end, a plurality of capacitors and inductors that have different electrical characteristics, or a combination thereof, so as to increase an operating frequency of an antenna.

The communications device further includes a switching circuit, and one end of the switching circuit is connected to a point between the first capacitor and the first high-pass circuit, and the other end of the switching circuit is coupled to the antenna grounding part. The switching circuit includes a single-pole multi-throw switch and different capacitors and inductors that are connected to a plurality of throw ends, or a combination thereof. In this way, the operating frequency of the antenna can be further increased.

A slot is included between the endpoint of the radiator and the antenna grounding part, and the slot and the second part are respectively located on two sides of the NFC feeding path; and on a side that is of the NFC feeding path and that is near the second part, no slot is disposed between the radiator and the side frame. Therefore, the foregoing antenna structure may be implemented by disposing only one slot on the communications device, so that a total quantity of slots on the communications device is reduced, and structure integrity is enhanced.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
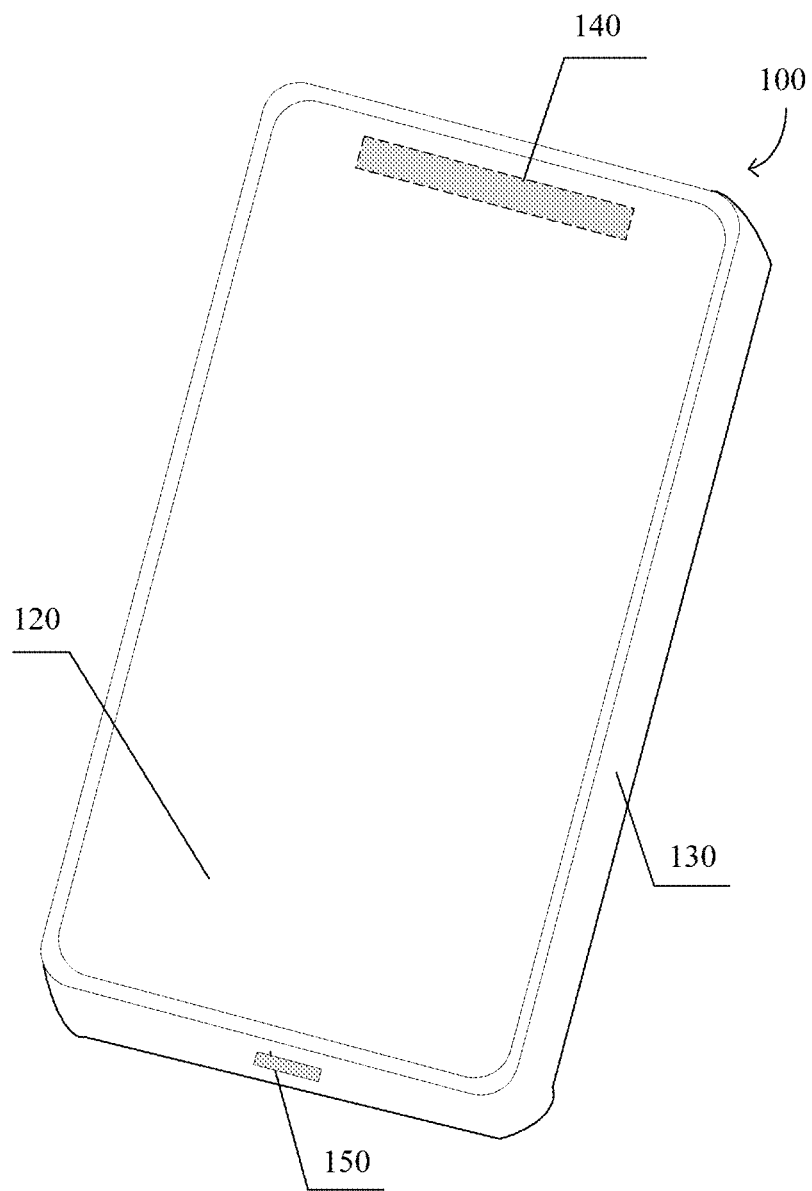
FIG. 1 is a schematic diagram of an external structure of a communications device according to an embodiment of the present invention.

Referring to FIG. 1, FIG. 1 is a schematic diagram of an external structure of a communications device according to an embodiment of the present invention. Communications devices used in the present invention include a mobile phone, a tablet computer, a laptop computer, a router, a home gateway, a set top box, an in-vehicle device, and the like. The "communications device" used as a term in the specification may be replaced by terms such as a terminal product, an electronic device, a communications product, a handheld terminal, and a portable terminal.

For example, the communications device 100 has a shape similar to a cube, and includes a front cover 120, a side frame 130, and a back cover (not shown in the figure). The side frame 130 may be divided into an upper frame, a lower frame, a left frame, and a right frame. These frames are connected to each other, and may form a specific radian or chamfer at a joint.

A keypad, a card tray cover, a speaker opening, a USB jacket, a headset jacket, and a microphone port may be disposed on the side frame. FIG. 1 schematically shows a USB jacket 150 disposed on the lower frame.

A screen, a keypad area, a speaker opening, and the like may be disposed on a surface of the front cover 120. FIG. 1 schematically shows a speaker opening 140 disposed at a location that is on the surface of the front cover and that is near the upper frame.

Figure 2:
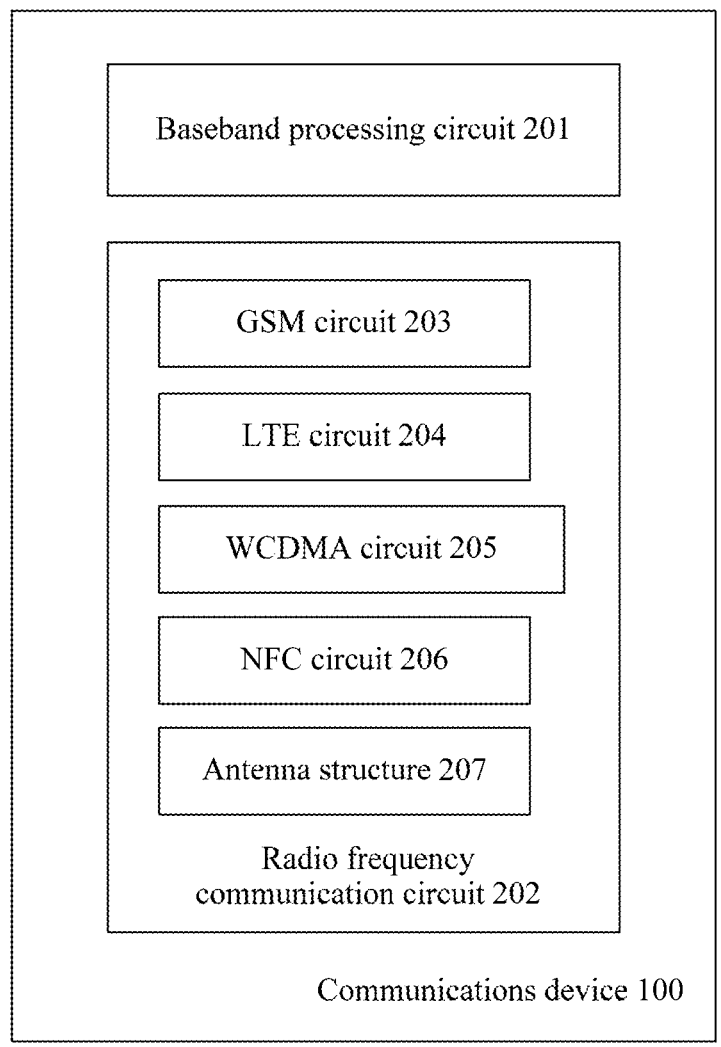
FIG. 2 is a schematic diagram of internal composition of a communications device according to an embodiment of the present invention.

Referring to FIG. 2, FIG. 2 is a schematic diagram of internal composition of a communications device 100 according to an embodiment of the present invention. The communications device 100 includes a baseband processing circuit 201 and a radio frequency communication circuit 202.

The radio frequency communication circuit 202 may be configured to support wireless communication on a plurality of radio frequency communication bands. The radio frequency communication frequency bands include: a Long Term Evolution (Long Term Evolution, LTE) frequency band such as 704 MHz-716 MHz, 1700 MHz-1755 MHz, or 1850 MHz-1900 MHz, a Global System for Mobile Communications (Global System for Mobile Communications, GSM) frequency band such as 824 MHz-849 MHz, a Wideband Code Division Multiple Access (Wideband Code Division Multiple Access, WCDMA) frequency band such as 1920 MHz-1980 MHz, and the like. Different radio frequency communication frequency bands are corresponding to different radio frequency communication circuits. For example, the GSM frequency band is corresponding to a GSM circuit 203, the LTE frequency band is corresponding to an LTE circuit 204, and the WCDMA frequency band is corresponding to a WCDMA circuit 205. These circuits may be independently disposed, or a plurality of circuits may include a shared part.

The radio frequency communication circuit 202 further includes an antenna structure 207, and the antenna structure 207 may be disposed in the communications device 100, for example, disposed on a printed circuit board or disposed on a surface of a dielectric support.

A part of a conductive frame of the communications device 100 may form a part or all of the antenna structure 207. With reference to FIG. 1, the conductive frame may be the side frame 130 of the communications device 100, or the conductive frame is located on the front or back of the communications device 100. For example, for a communications device that includes a screen, a metal part on an edge of the screen is used as a conductive frame of the communications device.

Figure 3:
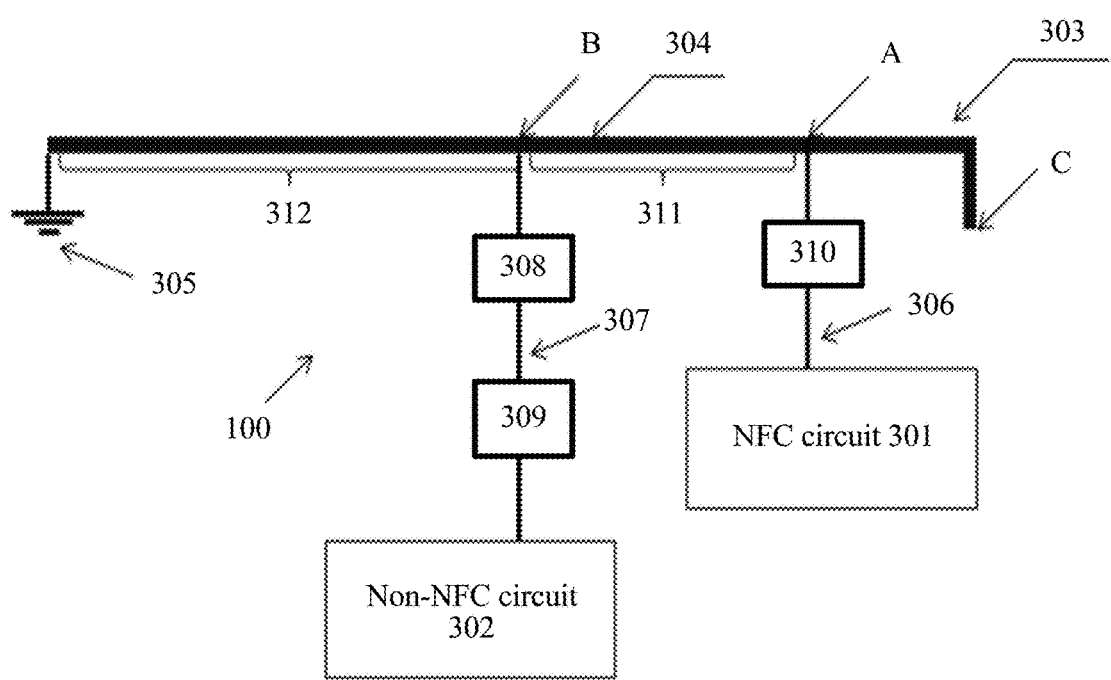
FIG. 3 is a schematic structural diagram of an antenna according to an embodiment of the present invention.

FIG. 3 is a schematic structural diagram of an antenna according to an embodiment of the present invention. The communications device 100 includes: an NFC circuit 301, configured to process an NFC signal; a non-NFC circuit 302, configured to process at least one low frequency signal and at least one high frequency signal, where both the low frequency signal and the high frequency signal are non-NFC signals; and an antenna structure 303, where the antenna structure 303 is coupled to the NFC circuit 301 and the non-NFC circuit 302. The antenna structure 303 includes a radiator 304 and an antenna grounding part 305, where the NFC circuit 301 and the radiator 304 are coupled by using an NFC feeding path 306, a connection point of the NFC feeding path 306 and the radiator 304 is a first node A, and the NFC feeding path includes a low-pass circuit 310. The non-NFC circuit 302 and the radiator 304 are coupled by using a non-NFC feeding path 307, a connection point of the non-NFC feeding path 307 and the radiator 304 is a second node B, the non-NFC feeding path 307 includes a first high-pass circuit 308 and a first capacitor 309, the first high-pass circuit 308 includes a second capacitor (not shown in the figure), and a capacitance value of the second capacitor is greater than a capacitance value of the first capacitor 309. The radiator 304 forms a first part 311 between the first node A and the second node B; and the radiator 304 further includes a second part 312, a first end of the second part 312 is coupled to the antenna grounding part 305, a second end of the second part 312 is connected to the first part 311 of the radiator 304, an electrical length of the second part 312 is less than a quarter wavelength corresponding to a resonance frequency of the low frequency signal, and the electrical length of the second part 312 is greater than an electrical length of the first part 311. The radiator 304 further includes a third part from the first node A to an endpoint C of the radiator.

It may be understood that when the endpoint C of the radiator is close to the antenna grounding part, a slot is included between the endpoint C of the radiator and the antenna grounding part.

Optionally, the radiator 304 is made of materials such as aluminum, copper, silver, and metal. These materials may be independently used or used in combination. The radiator 304 may be a continuous structure, or may include a plurality of radiation subparts, and the plurality of radiation subparts are coupled to each other by using air, an inductor, or a capacitor.

The communications device 100 includes a printed circuit board 401. Optionally, referring to FIG. 4a, the antenna grounding part 305 is formed on the printed circuit board 401. As a person skilled in the art knows well how to form the antenna grounding part on the printed circuit board, details are not described herein. Alternatively, referring to FIG. 4b, when the radiator 304 is implemented by using a conductive housing of the communications device 100, another part of the conductive housing is connected to the antenna grounding part 305. For example, the antenna grounding part 305 is formed on the printed circuit board 401, a side frame 130 is connected to the antenna grounding part 305 by using a frame grounding part 403, and a non-conductive material is filled between the endpoint C of the radiator and the grounded side frame 130, such as glass or plastic, so as to form a slot 402.

It should be noted that, in the embodiments of the present invention, the "antenna grounding part" may be replaced by words such as "ground", "antenna ground", and "ground plane", which are used to mean basically the same thing. The antenna grounding part is connected to a ground cable of a radio frequency transceiver circuit, and the antenna grounding part has a size larger than an antenna operating wavelength.

Optionally, an electrical connection device such as a spring, a screw, a spring plate, a conductive fabric, conductive foam, or a conductive adhesive is disposed on the printed circuit board. The first high-pass circuit 308 is disposed on the printed circuit board and is connected to the radiator 304 by using the electrical connection device. The antenna grounding part 305 is connected to the radiator 304 by using another electrical connection device. The low-pass circuit 310 is disposed on the printed circuit board and is connected to the radiator 304 by using still another electrical connection device.

Air, plastic, ceramic, or another dielectric material is filled between the radiator 304 and the antenna grounding part 305.

Figure 4A:
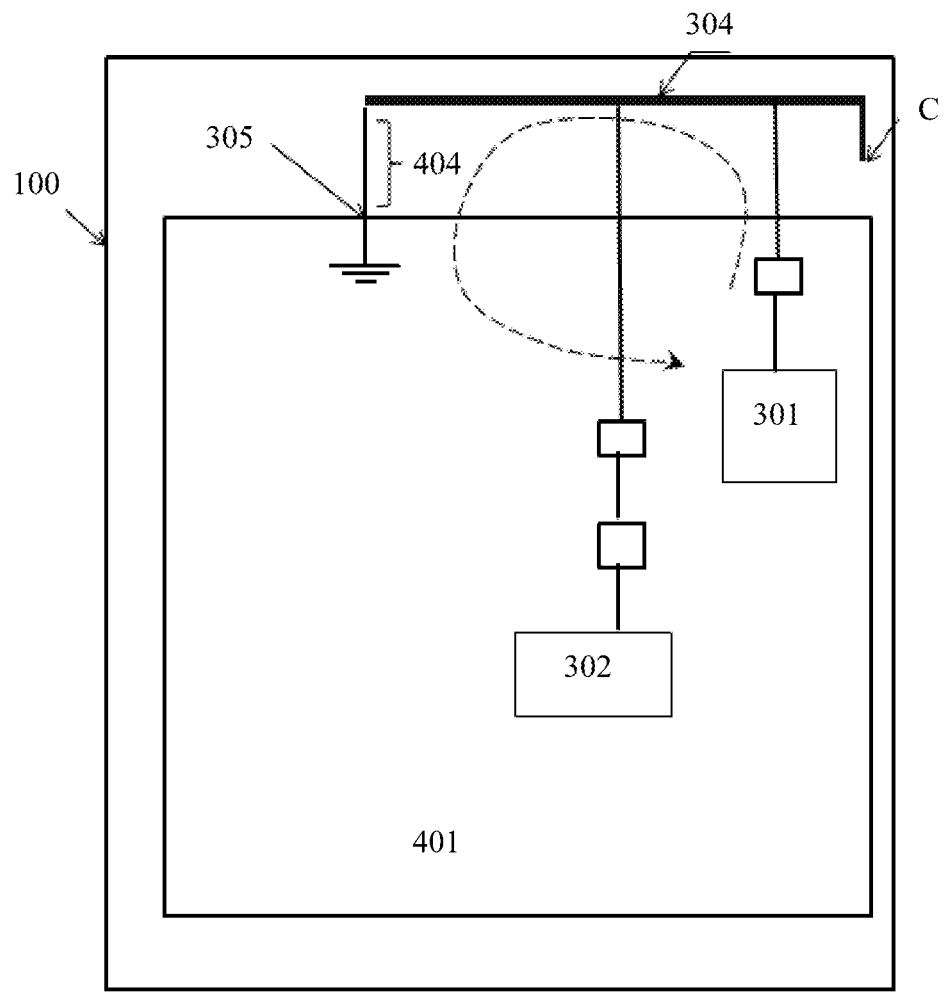
FIG. 4a is a schematic diagram of a communications device according to an embodiment of the present invention.
Figure 4B:
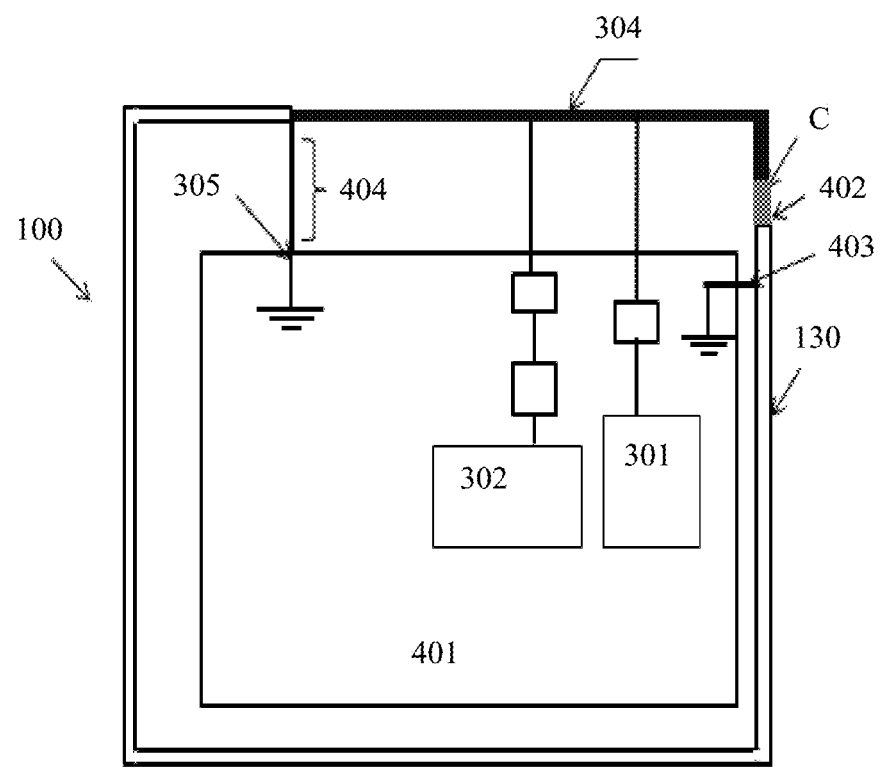
FIG. 4b is a schematic diagram of a communications device according to an embodiment of the present invention.

The NFC feeding path 306, the non-NFC feeding path 307, and a part of the second part (a grounding path 404 as shown in FIG. 4a or FIG. 4b) crosses an area formed by the air, the plastic, the ceramic, or the another dielectric material.

With reference to FIG. 1 and FIG. 4a, the NFC circuit 301 processes sent and received NFC signals. The NFC circuit 301 may include a signal generation circuit, a modulation or demodulation circuit, a power amplification circuit, a filter circuit, a duplex circuit, a balun circuit, a matching circuit, and the like. The NFC circuit 301 may be a circuit that includes elements such as a capacitor, an inductor, and a switch, and these elements may be connected in series or in parallel. The NFC circuit 301 includes a processor having a processing capability, or the NFC circuit 301 is connected to a processor having such a processing capability. The processor may invoke preset code to execute a preset algorithm. The NFC circuit 301 controls, according to the preset algorithm of the processor, opening or closing of a switch, a capacitance value, or an inductance value, and the like in the circuit. In an example of sending the NFC signal, according to the preset algorithm of the processor, a to-besent NFC signal is transmitted from the NFC circuit 301 to the first node A through the NFC feeding path 306, and a ring current path (refer to a dashed line with an arrow) is formed by using the first part 311, the second part 312, and the antenna grounding part 305.

The non-NFC circuit 302 is configured to process at least one low frequency signal and at least one high frequency signal, where both the low frequency signal and the high frequency signal are non-NFC signals. The non-NFC circuit 302 may include a signal generation circuit, a modulation or demodulation circuit, a power amplification circuit, a filter circuit, a duplex circuit, a balun circuit, a matching circuit, and the like. The non-NFC circuit 302 may be a circuit that includes elements such as a capacitor, an inductor, and a switch, and these elements may be connected in series or in parallel. The non-NFC circuit 302 includes a processor having a processing capability, or the non-NFC circuit 302 is connected to a processor having such a processing capability. The processor may invoke preset code to execute a preset algorithm. The non-NFC circuit 302 controls, according to the preset algorithm of the processor, opening or closing of a switch, a capacitance value, or an inductance value, and the like in the circuit. Still in an example of sending a signal, according to the preset algorithm of the processor, a to-be-sent low frequency signal is transmitted from the non-NFC circuit 302 to the second node B through the non-NFC feeding path 307, and is radiated mainly by using the second part 312 of the radiator 304. Optionally, an operating frequency of the low frequency signal is less than 960 MHz.

It is further noted that, for the low frequency signal, the first capacitor 309, the second part 312, and the antenna grounding part 305 constitute a low-frequency resonant structure, and the first part 311 and the third part AC are mainly used for impedance matching. An electrical length of the low-frequency resonant structure is less than a quarter wavelength corresponding to a resonance frequency of the low frequency signal.

It is further noted that, to form the low-frequency resonant structure, preferably, the capacitance value of the first capacitor 309 is less than 3 pF, and that the capacitance value of the second capacitor is greater than the capacitance value of the first capacitor 309 specifically means that the capacitance value of the second capacitor is at least an order of magnitude greater than the capacitance value of the first capacitor 309. For example, the capacitance value of the first capacitor 309 is less than 3 pF, the capacitance value of the second capacitor is greater than 33 pF, and the capacitance value of the second capacitor is 10 times greater than the capacitance value of the first capacitor 309; or the capacitance value of the first capacitor 309 is less than 0.9 pF, the capacitance value of the second capacitor is greater than 90 pF, and the capacitance value of the second capacitor is 100 times greater than the capacitance value of the first capacitor 309.

Optionally, the first capacitor 309 is implemented by using a lumped element or by means of cabling and coupling on the printed circuit board. Optionally, when the capacitance value of the second capacitor is relatively large, the second capacitor is implemented by connecting a plurality of capacitors in parallel.

The second capacitor mainly hinders the NFC signal to avoid connecting the NFC signal to the antenna grounding part by using the non-NFC feeding path. However, the second capacitor does not hinder a non-NFC signal.

It should be noted that in the non-NFC feeding path 307, a location of the first capacitor 309 and a location of the first high-pass circuit 308 may be interchanged. The non-NFC feeding path 307 may further include a matching circuit.

Still referring to FIG. 1, when the high frequency signal is sent, a to-be-sent high frequency signal is transmitted from the non-NFC circuit 302 to the second node B through the non-NFC feeding path, and is then radiated mainly by using the first part and the third part. Optionally, an operating frequency of the high frequency signal is between 1710 MHz and 2690 MHz.

Figure 5:
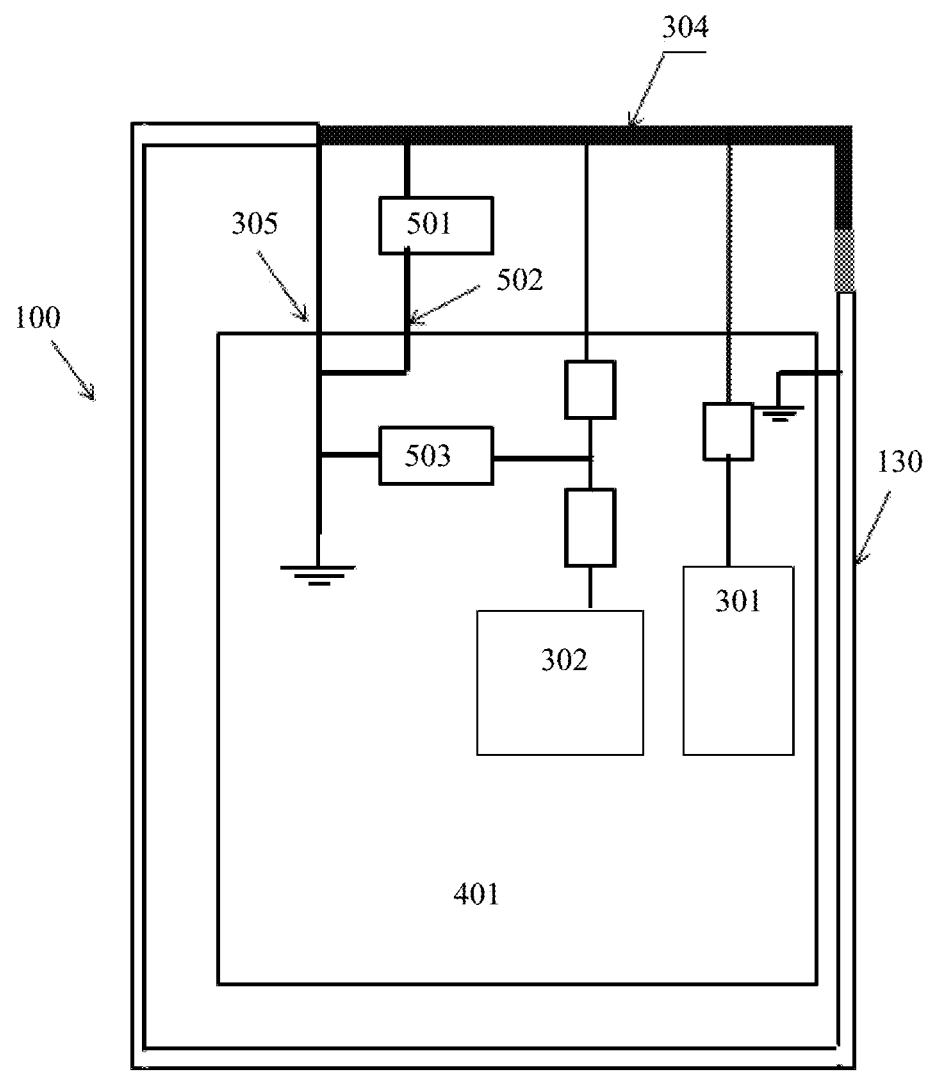
FIG. 5 is a schematic diagram of a communications device according to an embodiment of the present invention.

To further extend a signal coverage area, referring to FIG. 3 and FIG. 5, a grounding branch 502 is added to the second part 312 of the radiator 304, that is, between the antenna grounding part 305 and the non-NFC feeding path 307. One end of the grounding branch 502 is connected to the radiator 304, and the other end is connected to the antenna grounding part 305. The grounding branch 502 includes a second high-pass circuit 501, and the second high-pass circuit 501 includes at least one third capacitor. Optionally, a capacitance value of the third capacitor approximates to the capacitance value of the second capacitor.

Further, the grounding branch 502 further includes a single-pole multi-throw switch, a throw end, a plurality of capacitors and inductors that have different electrical characteristics, or a combination thereof, so as to increase an operating frequency of an antenna.

Figure 6:
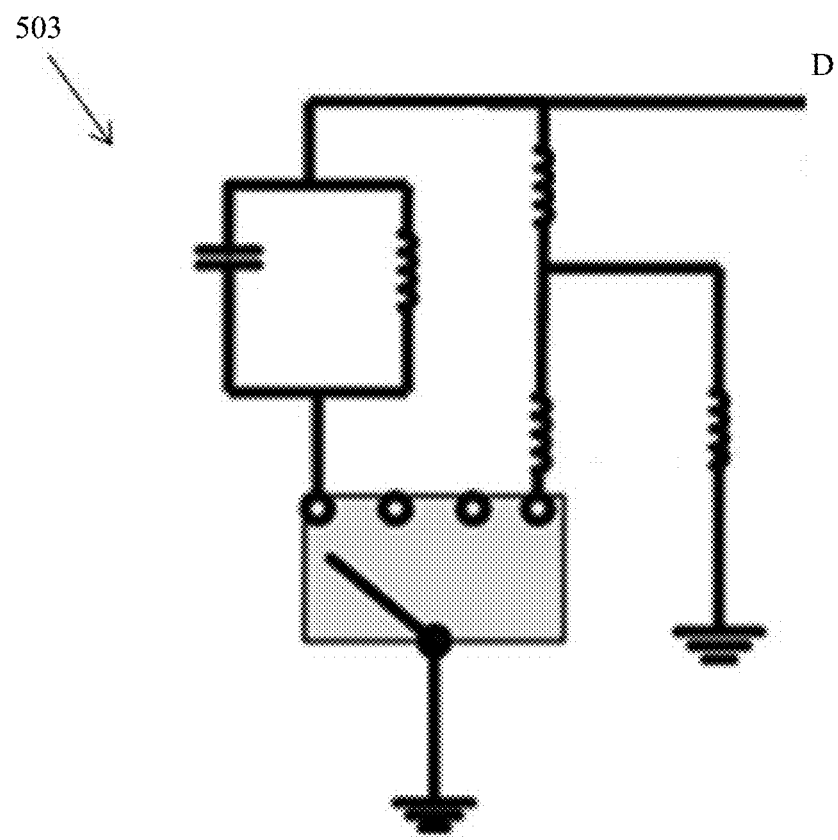
FIG. 6 is a schematic diagram of a switching circuit according to an embodiment of the present invention.

In addition, with reference to FIG. 5 and FIG. 6, the communications device further includes a switching circuit 503, where one end D of the switching circuit 503 is connected to a point between the first capacitor 309 and the first high-pass circuit 308, and the other end of the switching circuit 503 is coupled to the antenna grounding part 305. FIG. 6 shows an implementation of a switching circuit according to an embodiment of the present invention. The switching circuit 503 includes a switching device, for example, a single-pole multi-throw switch, capacitors and inductors that are connected to different throw ends, or a combination thereof. In this way, the operating frequency of the antenna can be further increased.

Further referring to FIG. 4b or FIG. 5, in this embodiment, the radiator 304 is a part of a side frame 130 of the communications device 100, the side frame 130 uses a conductive material such as metal, a slot 402 is disposed between the radiator 304 and another side frame 130 of the communications device 100, and the slot 402 is filled with a dielectric material, such as glass or plastic. The NFC circuit 301 and the non-NFC circuit 302 are connected to the radiator 304 by using respective feeding paths (306 and 307), and the radiator 304 is further connected to the antenna grounding part 305 by using the grounding path 404. Related content is not described. In this embodiment, the slot 402 and the ground path 404 are respectively located on two sides of the feeding paths (306 and 307); and on a side of the ground path 404, no slot may be disposed between the radiator 304 and the another side frame 130. Therefore, in this embodiment of the present invention, a quantity of slots on a frame of the communications device 100 may be reduced, so as to enhance structural coherence.

It should be noted that, in the embodiments of the present invention, the mentioned "coupling" of A and B means that an electrical signal passing through A and an electrical signal passing through B have a determined physical association, and includes: A and B are directly connected by using a conductor, a spring plate, or the like, or are indirectly connected by using another component C, or includes: respective signals of A and B have an association by means of electromagnetic induction.

It should be noted that a frequency mentioned in the embodiments of the present invention may be understood as a resonance frequency. For a person of ordinary skill in the art, a frequency within a range of 7-13% of the resonance frequency may be understood as an antenna operating bandwidth. For example, if a resonance frequency of an antenna is 1800 MHz, and an operating bandwidth is 10% of the resonance frequency, a range of an operating frequency band of the antenna is 1620 MHz-1980 MHz.

It should be noted that the capacitor and the inductor mentioned in the foregoing embodiments may be a lumped capacitor and a lumped inductor, may be a capacitor and an inductor, or may be a distributed capacitor and a distributed inductor. This is not limited in the embodiments of the present invention.

It should be noted that when ordinal numbers such as "first", "second" and "third" are mentioned in the embodiments of the present invention are only used for distinguishing unless the ordinal numbers definitely represent a sequence according to a context.

The foregoing descriptions are merely example embodiments of the present invention, but are not intended to limit the present invention. Any modification, equivalent replacement, and improvement made without departing from the principle of the present invention shall fall within the protection scope of the present invention.

What is claimed is:

1. A communications device, wherein the communications device comprises:
   a near field communication (NFC) circuit, configured to process an NFC signal;
   a non-NFC circuit, configured to process a low frequency signal and a high frequency signal, wherein both the low frequency signal and the high frequency signal are non-NFC signals; and
   an antenna structure, wherein the antenna structure is coupled to the NFC circuit and the non-NFC circuit, and the antenna structure comprises a radiator and an antenna grounding part, wherein
   the NFC circuit and the radiator are coupled by using an NFC feeding path, the NFC feeding path comprises a low-pass circuit;
   the non-NFC circuit and the radiator are coupled by using a non-NFC feeding path, the non-NFC feeding path comprises a first high-pass circuit and a first capacitor, the first high-pass circuit comprises a second capacitor, a capacitance value of the second capacitor is greater than a capacitance value of the first capacitor;
   the radiator forms a first part between a first node and a second node, wherein a connection point of the NFC feeding path and the radiator is the first node, a connection point of the non-NFC feeding path and the radiator is the second node;
   the radiator further comprises a second part, wherein a first end of the second part is coupled to the antenna grounding part, a second end of the second part is connected to the first part of the radiator, an electrical length of the second part is less than a quarter wavelength corresponding to a resonance frequency of the low frequency signal, and the electrical length of the second part is greater than an electrical length of the first part; and
   the radiator further comprises a third part from the first node to an endpoint of the radiator.

2. The communications device according to claim 1, wherein the communications device comprises a printed circuit board, the antenna grounding part being formed on the printed circuit board.

3. The communications device according to claim 2, wherein the radiator is formed on a first conductive side frame of the communications device.

4. The communications device according to claim 3, wherein a second conductive side frame of the communications device is connected to the antenna grounding part, and a non-conductive material is filled between the endpoint of the radiator and the second conductive side frame to form a slot.

5. The communications device according to claim 2, wherein the first high-pass circuit is disposed on the printed circuit board and is connected to the radiator by using a first electrical connection device; and the antenna grounding part is connected to the radiator by using a second electrical connection device, and the low-pass circuit is disposed on the printed circuit board and is connected to the radiator by using a third electrical connection device.

6. The communications device according to claim 5, wherein the first electrical connection device, the second electrical connection device, or the third electrical connection device comprises a screw.

7. The communications device according to claim 1, wherein that the capacitance value of the second capacitor is greater than the capacitance value of the first capacitor specifically means that the capacitance value of the second capacitor is at least one order of magnitude greater than the capacitance value of the first capacitor.

8. The communications device according to claim 7, wherein the capacitance value of the first capacitor is less than 3 pF, and the capacitance value of the second capacitor is greater than 32 pF.

9. The communications device according to claim 7, wherein the capacitance value of the first capacitor is less than 0.9 pF, and the capacitance value of the second capacitor is greater than 90 pF.

10. The communications device according to claim 1, wherein an operating frequency of the low frequency signal is less than 960 MHz.

11. The communications device according to claim 1, wherein an operating frequency of the high frequency signal is between 1710 MHz and 2690 MHz.

12. The communications device according to claim 1, wherein a slot is comprised between the endpoint of the radiator and the antenna grounding part, and the slot and the second part are respectively located on two sides of the NFC feeding path; and on a side that is of the NFC feeding path and that is near the second part, no slot is disposed between the radiator and the second conductive side frame.

13. The communications device according to claim 5, wherein the first electrical connection device, the second electrical connection device, or the third electrical connection device comprises a spring plate.

14. The communications device according to claim 1, wherein a grounding branch of the second part further includes a single-pole multi-throw switch, wherein a throw end of the single-pole multi-throw switch is connected to a capacitor and an inductor.

15. The communications device according to claim 1, wherein the communications device includes a switching circuit, and one end of the switching circuit is connected to a point between the first capacitor and the first high-pass circuit, and the other end of the switching circuit is coupled to the antenna grounding part.

16. The communications device according to claim 15, wherein the switching circuit includes a single-pole multi-throw switch and different capacitors and inductors that are connected to a plurality of throw ends.

17. The communications device according to claim 1, wherein dielectric material is filled between the radiator and the antenna grounding part.

18. The communications device according to claim 1, wherein the communications device is a mobile phone.

* * * * *